United States Patent [19]

Lobdell et al.

[11] 4,292,030
[45] Sep. 29, 1981

[54] TEACHING DEVICE FOR PROGRESSIVE POWER LENSES

[75] Inventors: Alban J. Lobdell, Plantation; Wiktor J. Rupp, Hollywood, both of Fla.

[73] Assignee: Itek Corporation, Lexington, Mass.

[21] Appl. No.: 112,588

[22] Filed: Jan. 16, 1980

[51] Int. Cl.³ .......................................... G09B 19/00
[52] U.S. Cl. ................................... 434/262; 351/169; 434/178
[58] Field of Search ...................... 35/8 R, 35 R, 35 B; 33/174 A; 351/169; 434/262, 178

[56] References Cited

U.S. PATENT DOCUMENTS

| | | | |
|---|---|---|---|
| 2,724,305 | 11/1955 | Brandt | 35/35 B X |
| 2,755,553 | 7/1956 | Vaughan | 33/174 A X |
| 2,803,884 | 8/1957 | Polley | 33/174 A |
| 2,917,971 | 12/1959 | Goddie et al. | 33/174 A X |
| 3,421,233 | 1/1969 | Gaal | 35/35 R |
| 3,687,528 | 8/1972 | Maitenaz | 351/169 |
| 3,711,191 | 1/1973 | Tagnon | 351/169 |
| 3,910,691 | 10/1975 | Maitenaz | 351/169 |
| 4,056,311 | 11/1977 | Winthrop | 351/169 |
| 4,115,924 | 9/1978 | Kleinkopf | 33/174 A |

OTHER PUBLICATIONS

"Comparing the Invisibles", *Opthmalic Dispensing*, Clifford W. Brooks, O.D., Feb., 1978, pp. 164-166.

Primary Examiner—William H. Grieb
Attorney, Agent, or Firm—Homer O. Blair; Robert L. Nathans; Gerald H. Glanzman

[57] ABSTRACT

A teaching device to assist first-time wearers of progressive power eyeglasses in becoming accustomed to their use. The device according to a preferred embodiment, comprises a decal adapted to be attached to the lenses of the glasses, and provided with precisely shaped and positioned cutouts to locate and uncover at least parts of the distance, reading and progressive corridor portions of the lenses.

By wearing glasses with the decal affixed to each lens for a couple of hours or so, the wearer can conveniently and easily learn which areas of the lenses to use for particular viewing tasks. After a couple of hours of use, the decals can simply be removed and discarded.

11 Claims, 3 Drawing Figures

TEACHING DEVICE FOR PROGRESSIVE POWER LENSES

DESCRIPTION

1. Technical Field

The present invention relates to a teaching device to assist first-time wearers of eyeglasses having progressively variable focal power lenses in becoming accustomed to their use.

2. Background Art

In recent years a new type of multifocal ophthalmic lens has been introduced into the marketplace. This lens is generally known as a progressively variable focal power lens or, more simply, as a progressive power lens, and it is designed to provide multifocal lens characteristics without any sharp dividing line or other discontinuity between the various portions of the lens.

Specifically, such lenses are characterized by having a progressive power portion positioned between the distance and reading portions of the lens and having a continuously varying focal power beginning with a focal power equal to that of the distance portion where it merges with and into the distance portion and ending with a focal power equal to that of the reading portion where it merges into the reading portion of the lens. By gradually varying in focal power in this way, the sharp dividing lines between the different portions of the lens are eliminated and a lens is provided that is continuous throughout, both physically and optically.

Typical of the progressively variable focal power lenses taught in the prior art are those described in U.S. Pat. Nos. 3,687,528; 3,711,191; 3,910,691 and 4,056,311.

Progressive power lenses possess both optical and cosmetic advantages over conventional multifocal lenses, many of which are pointed out in the above-identified prior art patents. There are also some disadvantages, however. For one thing, because there are no visible lines dividing the various portions of the lens, a first-time wearer might have quite a bit of difficulty in learning which portion of the lens to use for particular visual tasks. Becuase of this difficulty, in fact, many people never completely adapt to the use of this type of glasses.

A means for assisting the patient in adapting to these new type of glasses and for enabling him to become accustomed to them in a shorter period of time, would be very desirable.

DISCLOSURE OF THE INVENTION

By the present invention, a device is provided to assist a wearer in adapting to the use of progressively variable focal length eyeglasses. In the presently most preferred embodiment, this device takes the form of a decal which can be temporarily placed on the surfaces of the eyeglass lenses by the eyeglass dispenser. The decal is opaque and thus the wearer is prevented from looking through those areas of the lens that are covered. However, it is designed and shaped such that at least portions of the reading segment, the distance pupil, and the progressive power zone of the lens are uncovered and clearly identified.

By wearing the glasses with the decal affixed to each lens for, perhaps, a few hours, the wearer can very conveniently and easily learn which areas of the lenses should be used for particular tasks. After a few hours, the decals can simply be removed and discarded.

In addition to being usable as a teaching device by the wearer, the decal of the present invention can also be used by the wholesale laboratory or by the optical dispenser to help locate the optical centers of the distance and reading portions of the lenses for measuring or testing the lens or for other purposes. Thus, these decals actually serve a double function.

Further specific features of the invention will be set out hereinafter in conjunction with the description of the best mode for carrying out the invention.

BEST MODE FOR CARRYING OUT THE INVENTION

Figure 1:
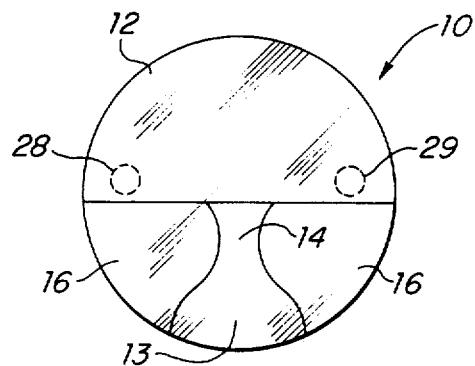
FIG. 1 schematically illustrates a progressive power lens with which the present invention may be used.

FIG. 1 schematically illustrates an ophthalmic progressive power lens 10 of conventional type for use with which the present invention was developed. Specifically, what is illustrated is in the front convex surface of such a lens which, in most embodiments, will be the progressive surface.

As shown, the lens surface may be considered as being divided into at least four portions or areas; distance portion 12, reading portion 13, progressive portion or corridor 14 and peripheral areas 16.

Distance portion 12 occupies essentially the top half of the lens. It is usually of constant doptric power throughout, and is used for viewing objects at distant locations. The reading portion 13 is located near the bottom of the lens, and is preferably also of constant power for use in viewing objects at normal reading distances.

Progressive corridor 14 is located between and optically connects the distance and reading portions of the lens surface. Specifically, progressive portion 14 comprises a corridor which extends from the distance to the reading portion and which gradually and continuously changes in power from a power equal to that of the distance portion where it joins and merges into the distance portion to a power equal to that of the reading portion where it merges into the reading portion. In viewing through this corridor, clear vision will be obtainable for objects located at infinity when viewed through the top of the corridor and for objects located at a reading distance when viewed through the bottom of the corridor. Clear vision will be obtained for intermediate distances when viewed through intermediate portions of the corridor.

Reference number 16 identifies the peripheral portions of the lens surface. The function of these areas is simply to connect the other three portions into one continuous optical surface.

It should be understood at this point that the divisions illustrated in FIG. 1 between the various portions of the lens surface are provided only for ease in explanation. In actuality, there are no lines or discontinuities present, either physical or optical. Instead, each portion of the lens surface gradually blends into and merges with adjacent portions. As the eye scans across the lens, for example, from the reading portion to the progressive corridor or from the progressive corridor to a peripheral portion, the wearer will not be able to readily discern any precise area or line where the change from one area to the other took place.

When a person is wearing glasses having progressive power lenses, he should, for the most part, view objects through the distance, reading or progressive corridor portions of the lens depending upon the distance of the object from the viewer. (The peripheral portions of the lens will contain aberrations, and, thus be less desirable for vision use.) Because there are no lines or discontinuities of any kind separating the distance, progressive, reading or peripheral portions of the lenses, however, the first-time wearer of progressive glasses tends to have some difficulty in learning where various lens portions are and in determining which area of the lenses to use for particular visual tasks.

It is to assist the first-time wearer in overcoming this difficulty that the present invention is directed. Specifically, the present invention comprises a teaching device adapted to be temporarily affixed to the lenses of a pair of progressive glasses (hereinafter, the term "progressive glasses" is used to refer to glasses having progressive power lenses) and left there for a couple of hours or so while the glasses are being worn to teach the wearer the areas of the lenses to look through for particular viewing tasks.

Figure 2:
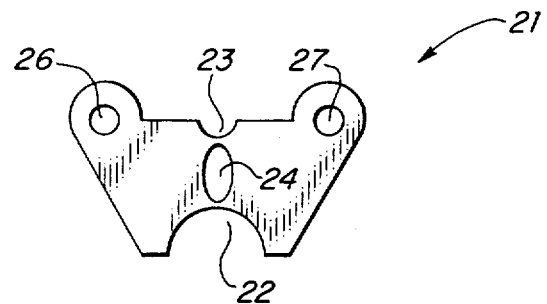
FIG 2. illustrates the teaching device according to a presently most preferred embodiment of the invention.

This teaching device is illustrated in FIG. 2 and comprises an opaque, somewhat butterfly-shaped element 21, sized to cover essentially the bottom half of a lens (see FIG. 3) and having a number of precisely shaped and positioned cutouts including cutouts 22, 23 and 24. Cutout 22, in particular, is of generally semicircular shape and is positioned so as to leave at least a portion of the reading portion 13 of the progressive lens (see FIG. 1) uncovered when the element is applied to the lens. Cutout 23, on the other hand, is also generally of semicircular shape but is positioned to leave an area of the distance portion 12 (FIG. 1) of the lens uncovered, preferably the distance pupil area surrounding the optical center of the distance portion inasmuch as this is the area the wearer would normally look through when viewing distant objects. Cutout 24, finally, is of elongated oval shape and is positioned to leave the progressive corridor 14 of the lens (FIG. 1) uncovered.

When the teaching device is properly affixed to the lenses of a pair of glasses as will be explained hereinafter, the reading portion, the progressive corridor portion and the distance pupil will be clearly identified. Also, most of the peripheral portions of the lenses will be covered. As a result, the wearer will be quickly and accurately taught how to best use the progressive glasses for optimum visual acuity. After, perhaps, a couple of hours, the teaching device can be removed from the lenses and discarded as they will no longer be needed.

As should be apparent, proper utilization of the teaching device necessitates that the elements 21 be accurately positioned on the lenses. It is for this reason that circular openings or cutouts 26 and 27 are provided. These openings are intended to be superimposed on a pair of very faint generally circular or other shaped markings 28 and 29 (FIG. 1) on the front surface of a progressive lens. The manufacture places markings 28 and 29 on the progressive lenses to assist the wholesale laboratory and/or the dispenser in locating the optical centers of the distance and reading portions of the lens surface. By aligning the openings 26 and 27 with the markings 28 and 29 on the lenses, the devices 21 can very easily be accurately positioned.

Figure 3:
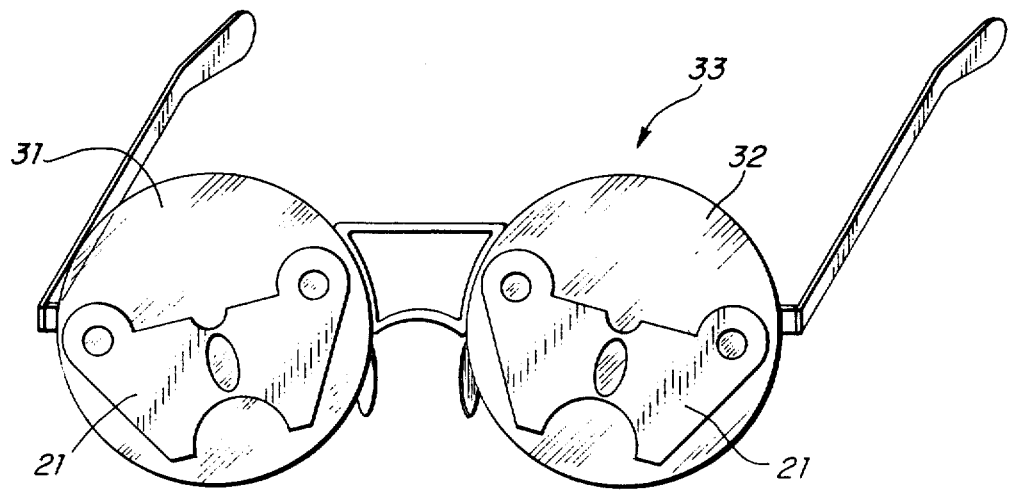
FIG. 3 illustrates the teaching device of FIG. 2 positioned on the lenses of a pair of spectacles.

FIG. 3 illustrates the elements 21 properly positioned on the lenses 31 and 32 of a pair of glasses 33. It should be noted that these elements are tilted inwardly somewhat. This is because, as is well-known in the field, when a pair of lenses are inserted into a pair of glasses, they must be tilted to accommodate for the left and right eye.

Element 21 is preferably in the form of a decal made of thin vinyl which has self adhering properties and which can be easily attached to the lenses and then later removed without damaging them in anyway. Alternatively, an adhesive backing can be applied to a vinyl or other material if desired.

Upon receiving the glasses with the decals properly positioned thereon by the dispenser, the patient should, as mentioned above, wear the glasses for a couple of hours or so with the decals in place. This should be enough time to enable the wearer to easily learn which areas of the lenses to use for particular tasks. After a few hours, these decals can be simply peeled off and thrown away.

It should also be pointed out that the device of the present invention actually performs a double function. Not only is it a teaching device as described herein, but it also can be used by the wholesale laboratory or the dispenser to locate the optical centers on the lenses. Devices for performing this optical center location function alone are known in the prior art, however, none of these devices are also usable as a teaching device as is the present invention.

While what has been described constitutes the best mode for carrying out the invention, it should be understood that the invention should not be so limited. For example, the precise shape of the elements could be varied in several respects, as can the size and/or shapes of the openings. Similarly, the elements could be made of any one of a number of which can be affixed or otherwise applied in any one of many ways.

Because the invention can take many forms, it should be clearly understood that it is to be limited only insofar as required by the scope of the following claims.

We claim:

1. A teaching device for use with progressively variable focal power lenses, said lenses being characterized by having at least a reading portion (13), a distance portion (12) and a progressive power portion (14), said teaching device comprising teaching means (21) adapted to be applied to one of the surfaces of said lens, and including identifying means (22, 23 or 24) for identifying the location of at least a part of one of said portions for assisting a user of such a lens in adapting to its use.

2. A teaching device as recited in claim 1 wherein said identifying means comprises an opening (22, 23 or 24) aligned with at least a part of one of said portions of said lens.

3. A teaching device as recited in claim 2 wherein said identifying means comprises openings (22, 23, 24) aligned with at least a part of each of said distance, reading and progressive power portions of said lens.

4. A teaching device as recited in claim 3 wherein said teaching means further includes alignment means (26 or 27) for aligning said openings with said reading, distance and progressive power portions of said lens.

5. A teaching device as recited in claim 4 wherein said alignment means includes indicia means (26, 27) for alignment with corresponding indicia (28, 29) provided on the surface of said lens.

6. A teaching device as recited in claim 3 wherein said teaching means comprises a decal adapted to be removably affixed to a progressive surface of said lens.

7. A teaching device as recited in claim 6 wherein said openings comprise cutouts formed on said decal.

8. A teaching device as recited in claim 7 wherein said decal comprises a flexible vinyl decal.

9. A teaching device to assist first-time wearers of eyeglasses having progressively variable focal power lenses in becoming accustomed to their use, said progressively variable focal power lenses being characterized by having at least a first portion (12) for viewing objects at distant locations, at least a second portion (13) for viewing objects at a reading distance and at least a third portion (14) having a progressively variable focal power for viewing objects at intermediate distances, said teaching device comprising teaching means (21) adapted to be applied to at least one of the lenses in said pair of eyeglasses, said teaching means including identifying means (22, 23 or 24) for identifying and locating at least parts of each of said reading, distance and progressive power portions of said lens.

10. A teaching device as recited in claim 9 wherein said identifying means comprises cutouts cut into said teaching means for identifying and locating at least parts of said reading, distance and progressive power portions of said lens.

11. A teaching device as recited in claim 10 and further including an additional pair of cutouts (26, 27) formed in said teaching means for aligning said teaching means with markings (28, 29) on said lens.

* * * * *